Patented Oct. 29, 1946

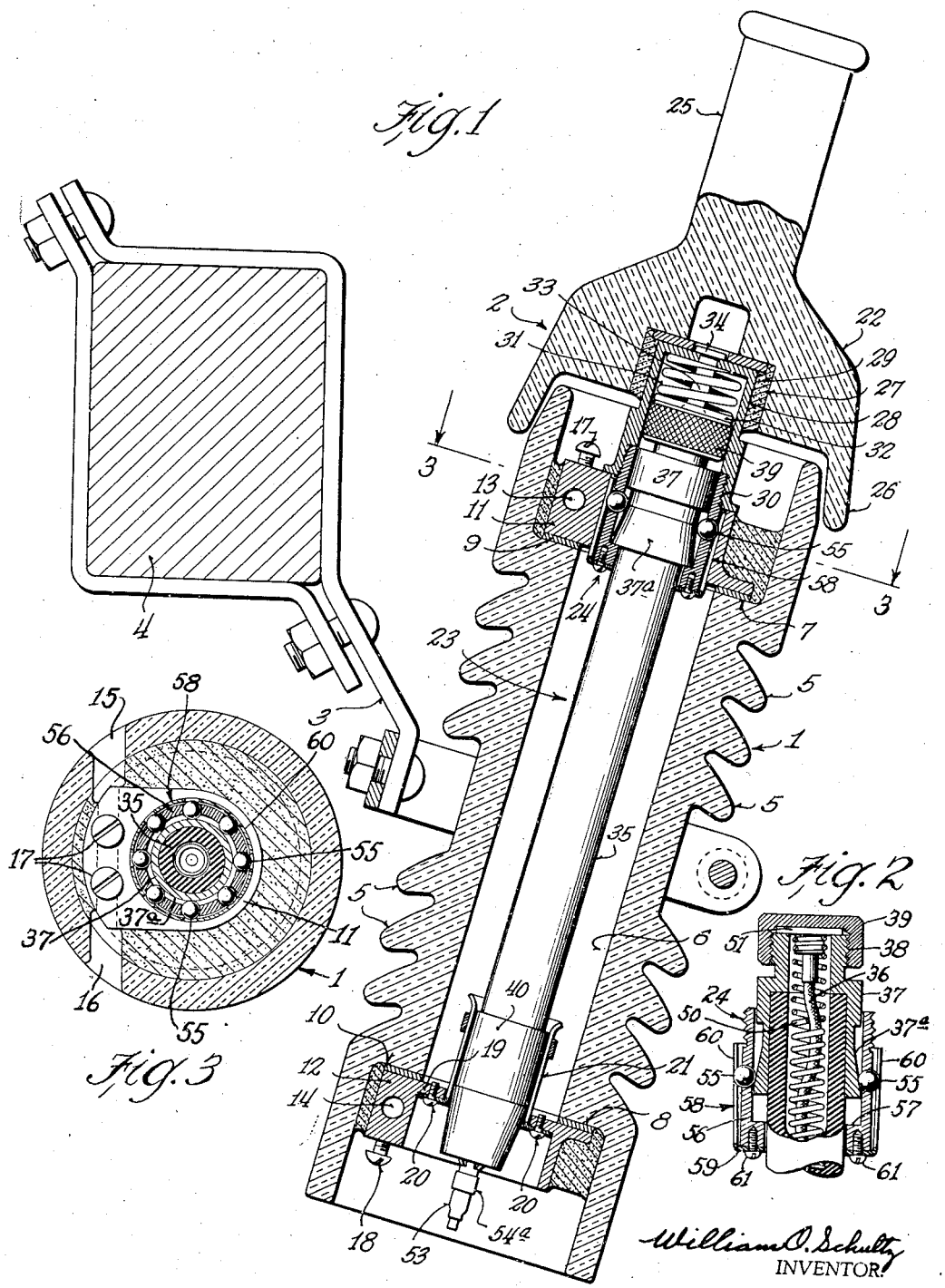

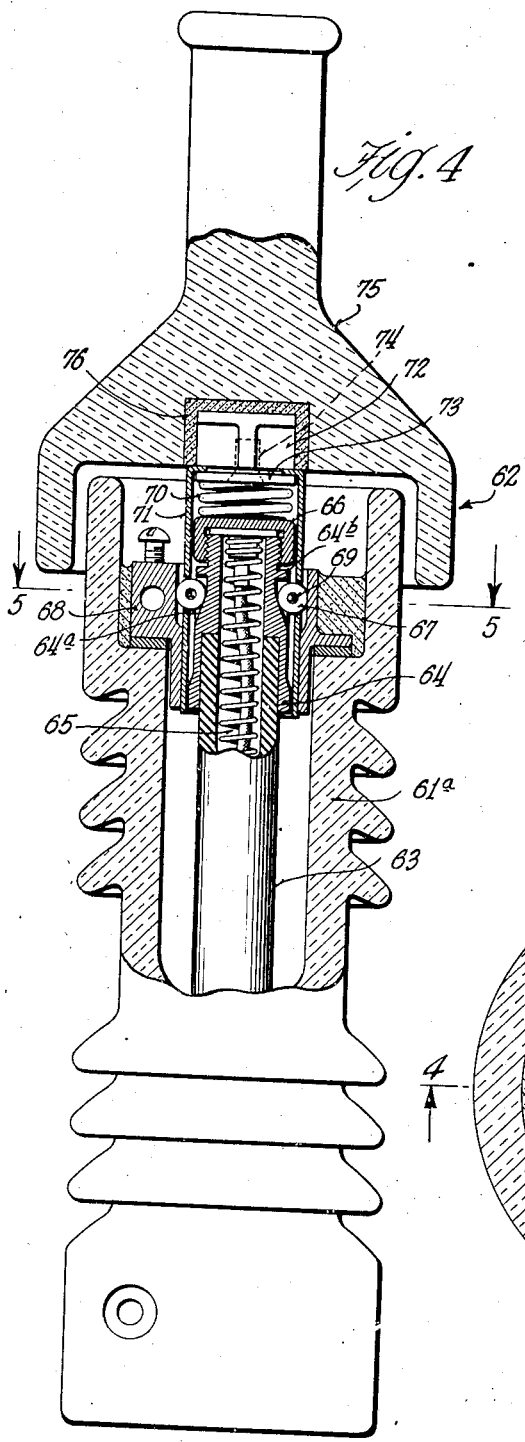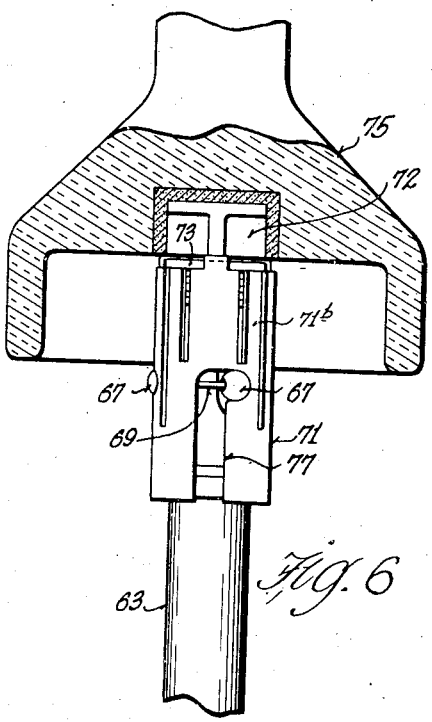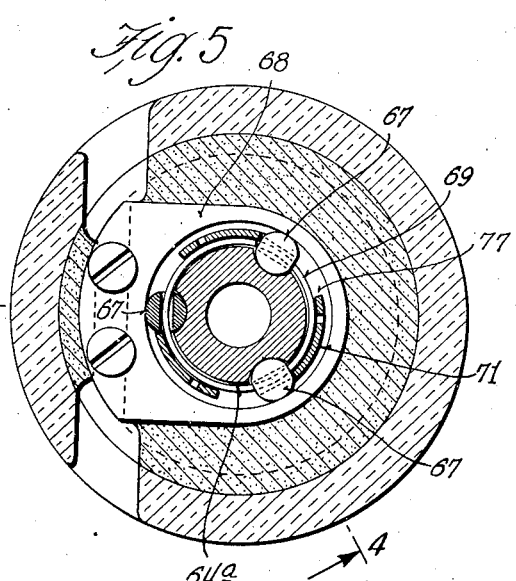

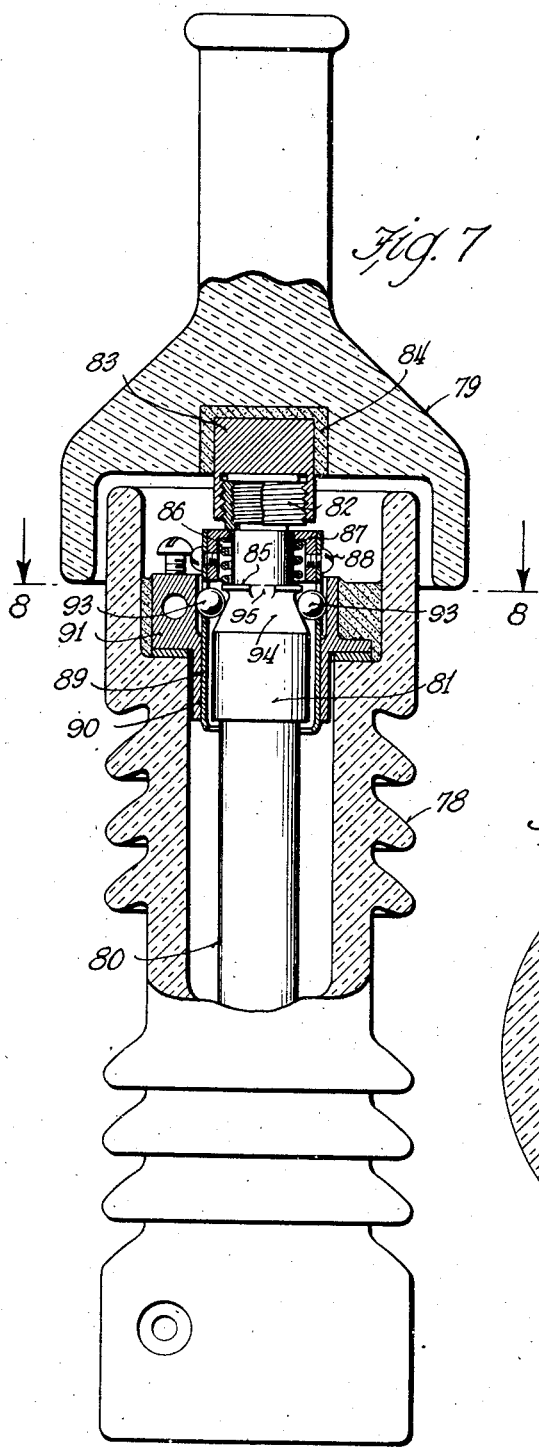
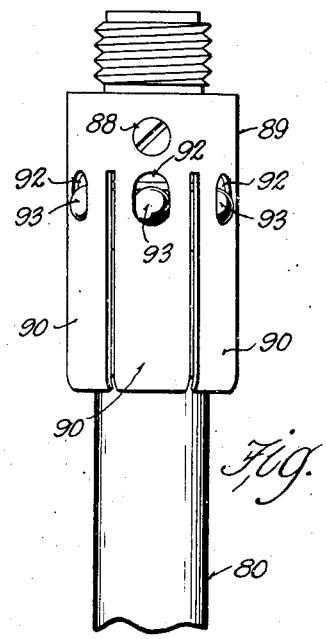
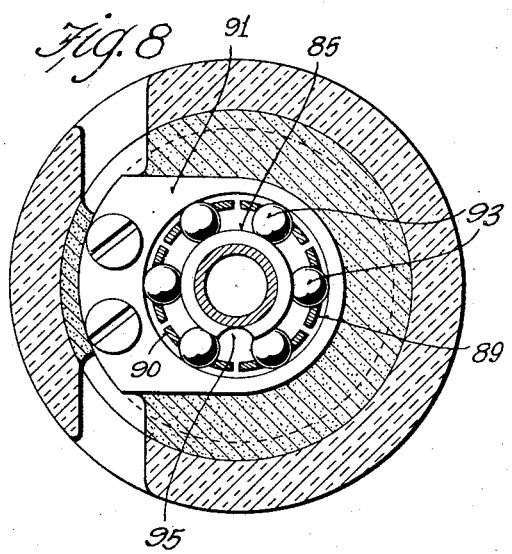

2,410,243

UNITED STATES PATENT OFFICE 2,410,243

BRAKE AND LOCK MECHANISM

William O. Schultz, South Milwaukee, Wis., assignor to Line Material Company, Milwaukee, Wis., a corporation of Delaware Application November 27, 1942, Serial No. 467,121

10 Claims. (Cl. 188—67)

This invention relates generally to brake and lock mechanisms and the like and has to do more particularly with a device which operates discriminatively as a restraining medium to prevent or limit relative movement between inter-related elements in response to forces applied in a predetermined manner and direction and tending to effect such relative movement, while at the same time being ineffective to restrain a like relative movement of said elements when the force tending to effect said relative movement is applied in a different predetermined manner. Otherwise and more specifically stated, the device of the present invention is operative, in response to a force applied to one side thereof in a given direction, effectively to resist said force and thus prevent or restrict relative movement, but is ineffective to resist force applied to the opposite side thereof and tending to bring about the same relative movement as the first-mentioned force; and said device is ineffective to oppose relative movements directionally opposite to the first-stated relative movement.

In fuse cut-outs of the so-called bayonet type which are used extensively on high-voltage primary electric transmission lines, the expulsion cartridge is attached to a cap member with which it forms a withdrawable fuse-unit; and the cartridge is designed to be inserted axially into a tubular housing from which the aforesaid fuse-unit, including the cartridge, is necessarily separable. When the fuse-link of such a cut-out blows it may do so with explosive violence, and the recoil of the explosive discharge is so directed as to tend to expel the aforementioned fuse-unit from the housing. Such expulsive action is not permissible and must be prevented—principally because of the hazard involved and, secondarily, because of the probable loss of or injury to the fuse-unit.

There would be no substantial problem entailed in affixing the unit to the housing in a manner effective to prevent expulsion thereof by the recoil were it not for the fact that the cut-outs frequently are mounted on cross-arms where they are not easily accessible. This renders it convenient, if not always necessary, for the lineman to use a switch stick to insert and withdraw the fuse-unit into and out of the housing; and, for that reason, it is desirable that the fuse-unit be withdrawable from the housing by a simple straight line movement as opposed to any twisting or other more or less complicated manipulation which could not readily be performed with a switch stick.

It is a cardinal feature of this invention that the fuse-unit is withdrawable from the housing by a simple straight-line movement which can easily be accomplished with a switch stick and normally requiring no preliminary twisting, turning, or other manipulation of the fuse-unit to effect release thereof; but it will be apparent that in some isolated instances straight-line withdrawal of the fuse-unit may be impeded or obstructed—possibly by the presence of foreign matter or corrosion—in which event it conceivably might be necessary to rotate the fuse-unit in order to break it loose before withdrawing it.

The object of the present invention is to provide a brake or lock mechanism of the above-denoted character suitable for use as a component part of a bayonet type fuse cut-out or like device, which will operate as an effective restraining medium to prevent expulsion of the fuse-unit or equivalent structure from its housing while permitting the fuse-unit easily to be withdrawn and inserted manually; and which is of rugged and durable construction, yet of such simple straightforward design that it can be manufactured economically without expensive tooling.

Three species of my invention are illustrated in the accompanying drawings and described hereinafter as integral components of bayonet type fuse cut-outs; but it is to be understood that there are other prospective uses for the device as, for example, in expulsion gap apparatus. Hence, the scope of the invention is not to be construed as limited, except in conformity with the terms of the appended claims.

The present invention is closely related to and an improvement upon the invention of Chester W. Brown disclosed in Brown's application Serial No. 466,512, filed November 21, 1942, now Patent No. 2,392,308, January 8, 1946, and entitled "Lock mechanism for electrical expulsion devices."

Referring to the drawings:

Figs. 1 to 4, inclusive, depict one of the preferred embodiments of the invention; Figs. 4 to 6, inclusive, depict a second species; and Figs. 7 to 9, inclusive, illustrate a third species.

Fig. 1 is a vertical sectional view showing a bayonet type fuse cut-out mounted on a cross arm;

Fig. 2 is a fragmentary elevational view, principally in vertical section, of a self-contained fuse cartridge which forms a separable component part of the fuse unit and of the entire fuse cut-out of Fig. 1;

Fig. 3 is an enlarged sectional view taken along the line 3—3 of Fig. 1;

Fig. 4 is a vertical sectional view, partly in elevation, taken along the line 4—4 of Fig. 5 and illustrating a second species of the invention as applied to a bayonet type fuse cut-out;

Fig. 5 is an enlarged sectional view taken along the line 5—5 of Fig. 4;

Fig. 6 is a detail view, partly in elevation and partly in section, illustrating the manner of detachably connecting the fuse cartridge of Fig. 4 to the cap member of the fuse-unit;

Fig. 7 is a vertical sectional view, partly in elevation, illustrating a third species of bayonet type fuse cut-out;

Fig. 8 is an enlarged sectional view taken along the line 8—8 of Fig. 7; and

Fig. 9 is a somewhat enlarged detail in elevation of the upper end of the fuse cartridge of Fig. 7.

Referring more especially to Fig. 1, the bayonet type fuse cut-out there illustrated comprises, as its major components, a housing 1, a fuse-unit 2, which is withdrawable from the housing, and mounting means 3 by which the cut-out is supported on a cross-arm 4.

Housing 1 is a tubular body of insulating material—usually porcelain—having a number of external, integral petticoats 5 which serve to increase lengthwise the leakage paths to ground and between terminals. The housing has a bore 6 extending axially therethrough—which bore is increased diametrically at both ends to form shoulders at 7 and 8. Seated on said shoulders, with gaskets 9 and 10 interposed, are conductive terminal rings 11 and 12. These are mutually in axial alignment and are spaced apart sufficiently to preclude, normally, all possibility of flashovers occurring therebetween. The respective terminal rings are drilled transversely, as indicated at 13 and 14, to accommodate terminals of the line conductors in which the fuse is to be inserted; and apertures 13 and 14 are in line with complementary openings in housing 1, as shown at 15, 16 in Fig. 3. Binding screws 17, 18 serve to clamp the line conductor terminals to the terminal rings.

Terminal ring 12 is counterbored to form a shoulder at 19 against which is secured by screws 20, axially with the housing bore, a tubular resilient contact member 21—which is yieldable radially to permit insertion and withdrawal of the lower terminal of the fuse cartridge for establishing an electrical connection between one line conductor terminal and one end of the fuse-link.

The fuse-unit, identified as a whole by reference numeral 2, comprises a cap member 22, fuse cartridge 23, and brake or lock mechanism 24—which latter is a component part of the fuse cartridge assembly.

Cap 22 is made of molded insulating material such as porcelain. It has an integral handle 25 by means of which the fuse-unit can easily be inserted and withdrawn; and it has a skirt portion 26 which overlies the upper end of the housing and thus affords shelter against the elements for the fuse cartridge and appurtenant parts inside the housing.

Cap 22 has a recess at 27 for the reception of a cup-like insert 28, which is secured therein by means of a sealer 29 such as cement or lead. Insert 28 is internally threaded at 30 to provide a detachable connection for the fuse cartridge; and it has within its bore a helical spring 31 which is held in place by a retainer disc 32 secured to the lower end of a rivet 33 having a button head 34 which bears against the back of insert 28. One function of spring 31 is to ensure good electrical contact with the upper terminal of the fuse cartridge while at the same time facilitating a limited longitudinal movement of the fuse cartridge assembly relatively to the cap—which movement must occur to enable the brake or lock mechanism to be effective, as hereinafter described.

The fuse cartridge assembly—detailed in Fig. 2—includes an expulsion tube 35 of horn fiber in which is contained a fuse-link 36. Secured to the upper end of tube 35 is a conductive ferrule 37, externally threaded at 38 to accommodate a removable metal cap 39. Electrical connection to the upper terminal of the fuse-link is effected through cap 39 and ferrule 37. To the lower end of tube 35 is secured a terminal member 40, which is tapered to facilitate insertion into the resilient contact member 21—see Fig. 1.

Fuse-link 36 including the retracting spring 50 is a self-contained unit—assembled before insertion in the cartridge. The upper ends of said flexible conductor and spring are both connected to a contact button 51, the flanged head of which is gripped between the upper end of ferrule 37 and cap 39. The fuse link terminates in a clip contact 53 adapted for contact with the terminal member 40. See Fig. 1.

When the fusible section not shown blows it may do so with explosive violence—depending upon the magnitude of the fault current—and the recoil due to the explosion tends to expel the fuse-unit upwardly out of the housing. Expulsion of the fuse-unit cannot be permitted because of the hazard to passers-by and, secondarily, because of the resultant loss or injury to the fuse-unit. Therefore, the fuse-unit must be secured against expulsion but, as previously pointed out, it often is important that the lineman be able to withdraw the fuse-unit by merely pulling on handle 25—without being obliged to turn or otherwise manipulate it, or to perform any other act which cannot readily be done with a switch stick. Conformably to that objective, the brake or lock mechanism 24 functions to prevent the fuse-unit being expelled from the housing by the aforementioned recoil force; and it does so without interfering in the slightest degree with intentional withdrawal of the fuse-unit in response to a moderate pull on handle 25—the only resistance to manual withdrawal being due, normally, to contact pressure on the terminals of the unit.

Describing now the brake or lock mechanism 24, ferrule 37 is turned to form a frustro-conically tapered external surface 37a of acute angularity with reference to the longitudinal axis of the fuse-unit. Said tapered surface is designed to function in the manner of an inclined plane for forcing outwardly a group of steel or bronze balls 55 spaced circumferentially, as shown in Fig. 4. These balls are arranged to be moved into contact with the bore of terminal ring 11 in response to a relative upward movement of ferrule 37—which upward movement is brought about whenever the blowing of the fuse is accompanied by an explosion of such violence as would otherwise expel the fuse-unit from the housing. This, manifestly, causes balls 55 to become wedged between the bore of the terminal ring and tapered surface 37a.

The base of the taper is too large, diametrically, to clear the balls, and the pressure created between the balls and the bore surface is so considerable that the resultant friction is enough to completely counter the recoil and prevent expulsion of the unit. The more acute the angle of tapered surface 37a the greater will be the pressure of the balls against the bore of the terminal ring, but care should be observed that the taper be not sufficiently acute to cause the balls to become jammed so tightly that spring 31 will not release them after the recoil force is spent.

Balls 55 are held in spaced relation and in their proper position relatively to tapered surface 37a by means of a cup-like member 56 which is provided with peripherally spaced holes to receive the balls individually. Said holes are of a diameter such as will permit the balls to pass therethrough without hindrance. Member 56 has an internal shoulder at 57 which is designed normally to abut the lower end of ferrule 37, as illustrated in Fig. 1. Spring 31 normally functions to hold fuse cartridge 23 in its down position, with the lower end of ferrule 37 resting on shoulder 57. With the ferrule thus disposed, balls 55 are released and do not press against the bore of terminal ring 11. Spring 31 is proportioned to compress under the recoil force sufficiently to permit a limited longitudinal movement of the cartridge relatively to the balls, thereby permitting the tapered portion 37a to operate as previously described.

The mass of cap 22 is of such magnitude that its inertia is sufficient to enable it to counteract the recoil force momentarily to an extent which enables spring 31 to compress enough to ensure balls 55 being moved into pressing engagement with the bore of terminal ring 11.

A cup-shaped retainer and contact member 58 is made of resilient conductive material such as spring phosphor bronze and comprises an inwardly turned flange 59 from which project upwardly a plurality (specifically eight) of spaced resilient fingers 60. The several spaces separating fingers 60 register with balls 55 and are wide enough to permit the balls to engage the bore of terminal ring 11, but narrow enough to prevent the balls passing therethrough. The outside diameter of member 58 is small enough to pass through the bore of terminal ring 11, but spring fingers 60 are flexed outwardly to effect good contact with said bore. Member 58 is secured to member 56 by means of screws 61.

The brake or lock mechanism is wholly ineffective to interfere with manual withdrawal of the fuse-unit from the housing because an upward pull on handle 25 will not cause a relative movement between tapered portion 37a and balls 55. Similarly, the brake or lock mechanism is ineffective to impede insertion of the fuse-unit into the housing because spring 31 is stiff enough to offset the resistance of lower contact member 21 to insertion therein of terminal member 40 and will not deflect sufficiently in response to that resistance to cause tapered portion 37a to actuate balls 55.

The structure of Figs. 4 to 6 inclusive, hereinbefore referred to as the second species, comprises a housing 61a which is almost identical with housing 1 of Fig. 1, and a fuse-unit 62 which is generally similar to fuse-unit 2 of Fig. 1—differing therefrom mainly in the design of brake and lock mechanism. The latter involves the same mode of operation and underlying principles which characterize the brake and lock mechanism of Fig. 1, previously described, but the details of construction are somewhat at variance with those of Fig. 1, as will presently be pointed out. It may be assumed, for completeness of disclosure, that details not illustrated in Fig. 4 are in conformity with Fig. 1; but, as will be self-evident, those details bear no limiting relation to the invention defined by the subjoined claims and are presently unimportant aside from the necessity for an operative and usefully complete structure.

The expulsion tube 63 corresponds to expulsion tube 35 of Figs. 1 and 2 and has attached to its upper end a metal ferrule 64 corresponding in function to ferrule 37. The fuse-link 65 is identical with fuse-link 36, and the removable metal cap 66 may be in all respects the same as cap 39.

Ferrule 64 is frustro-conically tapered externally at 64a and is operative in response to the force of recoil and in the manner of an inclined plane to force outwardly the three balls 67 which are equally spaced thereabout, as shown in Fig. 5. The latter are designed to pressingly engage the bore of terminal ring 68 when actuated as above described. Balls 67 are pierced diametrically and are held in place, when the fuse-unit is withdrawn from the housing, by a wire ring 69.

A helical spring 70 presses downwardly against cap 66 and is designed to yield under the recoil force of an explosive blow-out so as to permit a relative upward movement of the cartridge and thus ensure the necessary quick outward movement of the balls whereby to secure the fuse-unit against expulsion.

Telescopically encircling ferrule 64, cap 66 and spring 70 is a tubular metal shell 71 which is provided at its upper end with inwardly projecting ears by which it is secured to a metal insert 72 through the medium of an overlapping washer 73 and a flat head screw 74. Insert 72 is embedded in a recess in porcelain cap 75, being anchored by means of a cement or lead filler 76.

Tubular shell 71 is depicted in elevation in Fig. 6 wherein is shown one of three bayonet slots 77 which are equally spaced circumferentially and designed to engage, respectively, the three balls 67 whereby to secure the fuse cartridge in place against the pressure of spring 70 and against the axially directed force required to withdraw the fuse-unit from the housing. It will be observed that it is necessary to withdraw the expulsion cartridge, including ferrule 64 and cap 66 from tubular shell 71 in order to replace the fuse link, and this is accomplished by rotating the cartridge relatively to shell 71 in a direction effective to move balls 67 into line with the lengthwise portions of bayonet slots 77, and thereafter pulling the expulsion cartridge out of the tubular shell. The manipulation required to replace the expulsion cartridge after re-fusing is, obviously, the reverse of that required to withdraw it from the shell.

Bayonet slots 77 divide the lower portion of shell 71 into three depending sections which are sprung outwardly to firmly engage the bore of terminal ring 68 and effect good electrical contact therewith. The upper portion of shell 71 is longitudinally slotted to form a plurality of fingers 71b (see Fig. 6) which are sprung inwardly to firmly engage cap 66. Thus, a reliable electrical connection is secured between terminal ring 68 and the upper terminal of the fuse link.

The brake and lock mechanism of Figs. 4 to 6 operates in the same manner as the corresponding mechanism of Figs. 1 to 3, to prevent expulsion of the fuse-unit when an explosive blow-out occurs; and the fuse-unit is withdrawable from the housing in response to a straight line pull, without twisting or other manipulation.

In manually withdrawing the fuse-unit from the housing, balls 67 are lifted by the tubular shell into engagement with shoulder 64b. Said balls, therefore, serve as the intercoupling media whereby the expulsion tube is withdrawn. This is not true of either of the other two species of the invention illustrated and herein described.

The structure of Figs. 7 to 9, hereinbefore referred to as the third species, is still another form of the invention applied to a bayonet type fuse cut-out. Here the porcelain housing is identified by reference numeral 78 and is practically the same as in the previously described embodiments. Likewise, the porcelain cap 79 is substantially identical with those of the previously described structures; and the same is true of the expulsion tube 80.

The metal ferrule 81 is externally threaded at its upper end to engage an internally and externally threaded sleeve 82, which preferably is also soldered to the ferrule to prevent unscrewing after assembly. Sleeve 82 is detachably threaded into a metal cap 83 which is anchored in a recess in cap 79 by means of a cement or lead filler 84. The button head of the fuse-link is clamped between the top surface of ferrule 81 and cap 83, and the fuse-link is replaceable by unscrewing the cartridge from cap 83. The fuse-link is not otherwise shown in Figs. 7 to 9.

Formed on ferrule 81 and integral therewith is a peripheral external flange 85 which constitutes an abutment for the lower end of a helical spring 86, which encircles the ferrule and bears at its upper end against the under side of an inwardly projecting flange formed on the upper end of a collar 87 to which is attached, by means of screws 88, a depending tubular shell 89. The latter is slotted longitudinally as shown in Fig. 9 to form several circumferentially disposed contact fingers 90 which are sprung outwardly sufficiently to firmly engage and make electrical contact with the bore of upper terminal ring 91. At equally spaced points about the periphery of tubular shell 89 are six elongated openings 92, each of a width substantially less than the diameter of steel balls 93, which project through said openings but are retained by the tubular shell against falling out of the ball receiving compartment in which they are shown, when the fuse-unit is withdrawn from the housing. The frustro-conically tapered portion 94 of ferrule 81 is designed to actuate the steel balls in the manner previously described. Flange 85 is notched at 95 to permit insertion of balls 93 during the course of assembly. The lower ends of contact fingers 90 are curved to facilitate insertion into the upper terminal ring.

The structure of Figs. 7 to 9 operates according to the same principle as that which governs the operation of the first and second described species, but it differs therefrom in that cap 79 is rigidly secured to the expulsion cartridge so that there is no relative longitudinal movement between the cap and the cartridge in response to the recoil attending an explosive blow-out. Here the relative longitudinal movement takes place between ferrule 81 and the sub-assembly comprising collar 87 and tubular shell 89. Spring 86 must be of such resilience that it will yield enough to permit balls 93 to be forced into engagement with the bore of terminal ring 91; yet it must be stiff enough to overcome, without excessive deflection, the resistance of the tubular shell to withdrawal from the terminal ring. If the spring is too soft it will not function to prevent locking in response to an attempt to withdraw the fuse-unit manually. Re-fusing is accomplished by unscrewing the expulsion tube from cap 83.

While in Fig. 7 balls 93 are shown in touching engagement with the bore of terminal ring 91, it is to be understood that there is actually some clearance—although micrometric—between the balls and said bore and that normally the balls are supported out of actual contact with said bore by virtue of the fact that they rest on the lower edges of openings 92. No clearance has been shown because it is desired to emphasize that the fit is close—thus ensuring prompt locking action in response to a suddenly applied recoil force.

What is claimed is:

1. In combination, a pair of members comprising a first member and a second member, said members being movable, both relatively to each other and conjointly, along a prescribed path in two opposite directions alternately, spring means continuously biasing said members oppositely lengthwise of said path, a third member adjacent said path and relatively stationary with reference to said pair of members, said second member being interposed between said first and third members and having means co-operative with said first member for limiting relative movement lengthwise of said path between said first and second members, said first member having a surface which is acutely angular to the trend of said path, and a rollable member disposed between said first and third members and traversing said second member and located thereby in predetermined relation to said members lengthwise of said path, said rollable member normally having a limited free movement laterally of said path and actuable by said acutely angular surface into braking engagement with said first and third members in response to a movement of said first member relatively to said second member against the bias of said spring means and along said path in one only of said directions, said rollable member, conjointly with said third member, being effective, when actuated, to restrain said first member against further movement in said one direction, except movement in said one direction imparted to said first member by said second member.

2. In combination, a stationary member having a bore, and structure movable through said bore axially thereof and in two opposite directions alternately, said structure including a first member and a second member telescopically intercoupled, the overlapping portions of said first and second members being encircled, jointly, by said bore, said second member being interposed between said first member and said bore, said second member having a series of apertures spaced circumferentially around the longitudinal axis of said bore, a plurality of balls, each in one of said apertures individually, said first member being movable axially relatively to said second member and having a tapered portion operative to engage and move said balls into braking engagement with said bore in response to a movement of said first member in a predetermined one only of said directions relatively to said second member, said balls, conjointly with said stationary member, being operative to restrain said first member against further movement in said one direction when said balls are engaged with said bore, except movement in said one direction imparted to said first member by said second member.

3. In combination, a stationary member having a bore, and structure movable through said bore axially thereof and in two opposite directions alternately, said structure including a first member and a second member telescopically intercoupled, the overlapping portions of said first and second members being encircled, jointly, by said bore, said second member being interposed between said first member and said bore, a spring between said first and second members biasing said first and second members in opposite directions axially, said second member having a series of apertures spaced circumferentially around the longitudinal axis of said bore, a plurality of balls, each in one of said apertures individually, said first member being movable axially relatively to said second member in one direction only against said spring and having a conically tapered portion operative to engage and move said balls into braking engagement with said bore in response to a movement of said first member against said spring in said one direction relatively to said second member, said balls, conjointly with said stationary member, being operative to restrain said first member against further movement in said one direction, except movement in said one direction imparted to said first member by said second member.

4. In combination, a stationary member having a bore, and structure movable through said bore axially thereof in two opposite directions alternately, said structure including a first member and a second member, said first member being telescoped within said second member and having a limited freedom of movement axially with respect thereto, said first member having a conical portion concentric with said second member, a coil spring disposed between said first and second members for biasing said members oppositely, said second member having a row of spaced apertures arranged circumferentially therearound, and a plurality of balls, each in one of said apertures individually, said row of apertures being so positioned that said balls are normally deactuated, said balls being actuable by said conical portion into engagement with said bore in response to an axial movement of said first member relatively to said second member against said spring.

5. In combination, a stationary member having a bore, and structure movable through said bore axially thereof in two opposite directions alternately, said structure including a first member and a second member, said first member being telescoped within said second member and having a limited freedom of movement axially with respect thereto, said first member having a conical portion concentric with said second member, a coil spring disposed between said first and second members for biasing said members oppositely, said second member having a row of spaced apertures arranged circumferentially therearound, a plurality of balls, each in one of said apertures individually, said row of apertures being so positioned that said balls are normally deactuated, said balls being actuable by said conical portion into engagement with said bore in response to an axial movement of said first member relatively to said second member against said spring, and a retainer carried by said second member and comprising a plurality of spaced axially extending fingers disposed circumferentially around said second member and projecting, individually, between adjacent ones of said apertures, the spacing of said fingers being wide enough to permit said balls to engage said bore but narrower than the diameter of said balls whereby to retain said balls within said apertures, said fingers being operative to contact said bore.

6. In combination, a stationary member having a bore, a first member movable axially through said bore in opposite directions alternately, a second member encircling said first member and telescopically interposed between said first member and said bore, a plurality of rollable members interposed between said first member and said bore and extending through apertures in said second member, said first member having an acutely angular portion operative to engage and actuate said rollable members into pressing engagement with said bore in response to axial movement in one direction only of said first member relatively to said second member, said first and second members being relatively movable axially, and means including said rollable members for intercoupling said first and second members whereby an axial movement of said second member in said one direction will effect a like movement of said first member without causing said rollable members to pressingly engage said bore, said second member being operative to hold said rollable members in a position wherein they are unsusceptible to effective actuation by said angular portion, except when axial movement is imparted abruptly to said first member, relatively to said second member, in said one direction only.

7. In combination, a stationary member having a bore, a first member movable axially through said bore in opposite directions alternately, a tubular member coaxial with and encircling said first member and interposed telescopically between said first member and said bore, said tubular member frictionally contacting said bore, a plurality of locking members spaced circumferentially about said first member and situated immediately adjacent a wedging portion formed on said first member and operative to force said locking members into pressing engagement with said bore in response to an axial movement of said first member relatively to said tubular member in one predetermined direction only, said tubular member being provided with bayonet slots registering individually with said locking members and co-operative with said locking members for interlocking said tubular member and said first member against separation axially, said locking members being disengageable from said bayonet slots by rotating said tubular member relatively to said first member, said tubular member having means normally engaging said locking members for blocking effective actuation thereof by said wedging portion, the aforementioned blocking action being continuously exerted by said tubular member except when axial movement, relatively to said tubular member, is imparted abruptly to said first member in said one direction only.

8. In combination, a stationary member having a bore, a first member movable axially through said bore and having a frustro-cone coaxial with said bore, a plurality of locking members spaced circumferentially around said first member and interposed between said frustro-cone and said bore, a second member having a tubular portion encircling said frustro-cone and interposed telescopically between said frustro-cone and said bore, a spring interposed between said first and second members and tending to effect axial movement of said members oppositely, said tubular portion having a plurality of bayonet slots arranged to receive said locking members individually and co-operative with said locking members for interlocking said first and second members against separation axially, said locking members being disengageable from said bayonet slots by rotating said members relatively, said tubular portion normally engaging said locking members for restraining effective actuation thereof by said frustro-cone, except when axial movement is imparted abruptly to said first member in one predetermined direction only and independently of said second member, whereby relative axial movement is effected between said first and second members to release said locking members from the normal restraint exercised thereon by said tubular portion.

9. In combination, a stationary member having a bore, a first member having a frustro-cone coaxial with said bore, a plurality of locking members spaced circumferentially around said first member and interposed between said frustro-cone and said bore and adapted to be actuated by said frustro-cone into pressing engagement with said bore, a second member having a tubular portion encircling said frustro-cone and interposed telescopically between said frustro-cone and said bore, said second member being carried by said first member and movable axially to a limited extent with respect thereto, and a helical spring encircling said first member and interposed lengthwise between abutments carried by said first and second members respectively, said first and second members being urged axially and oppositely by said spring, said second member normally engaging said locking members for blocking effective actuation thereof and being thus continuously effective except when axial movement is imparted abruptly to said first member in one predetermined direction only, independently of said second member, whereby relative axial movement is effected between said first and second members against the opposition of said spring, to release said locking members from the aforementioned blocking action normally exerted thereon by said second member.

10. In combination, a stationary member having a bore, a first member movable axially through said bore and having a tapered portion, a plurality of balls disposed about said first member in actuable relation to said tapered portion and adapted to be actuated by said tapered portion into pressing engagement with said bore in response to an axial movement of said first member in one predetermined direction only, a tubular member normally operative to hold said balls out of actuable relation to said tapered portion, said tubular member being carried by said first member and movable therealong axially to a limited extent, a helical spring for yieldably maintaining said tubular member in its normal position relatively to said first member, the arrangement being such that an axial movement of said first member relatively to said tubular member and against the opposition of said spring is effective to release said balls from the restraint normally exerted thereon by said tubular member and is resultantly effective to actuate said balls into pressing engagement with said bore.

WILLIAM O. SCHULTZ.